(12) United States Patent
Park et al.

(10) Patent No.: US 11,562,177 B2
(45) Date of Patent: Jan. 24, 2023

(54) TRIPLE VERIFICATION DEVICE AND TRIPLE VERIFICATION METHOD

(71) Applicant: Foundation of Soongsil University-Industry Cooperation, Seoul (KR)

(72) Inventors: Young Tack Park, Seoul (KR); Jagvaral Batselem, Seoul (KR); Wan Gon Lee, Seoul (KR)

(73) Assignee: Foundation of Soongsil University-Industry Cooperation, Seoul (KR)

( * ) Notice: Subject to any disclaimer, the term of this patent is extended or adjusted under 35 U.S.C. 154(b) by 652 days.

(21) Appl. No.: 16/697,238

(22) Filed: Nov. 27, 2019

(65) Prior Publication Data

US 2021/0064935 A1    Mar. 4, 2021

(30) Foreign Application Priority Data

Sep. 3, 2019    (KR) ........................ 10-2019-0108915

(51) Int. Cl.
| | |
|---|---|
| *G06K 9/00* | (2022.01) |
| *G06K 9/62* | (2022.01) |
| *G06N 3/08* | (2006.01) |
| *G06N 3/04* | (2006.01) |
| *G06F 17/16* | (2006.01) |

(Continued)

(52) U.S. Cl.
CPC ............ *G06K 9/6262* (2013.01); *G06F 17/16* (2013.01); *G06N 3/0454* (2013.01); *G06N 3/084* (2013.01);

(Continued)

(58) Field of Classification Search
CPC .. G06K 9/6262; G06K 7/1482; G06K 9/6253; G06K 9/6263; G06F 17/16;

(Continued)

(56) References Cited

U.S. PATENT DOCUMENTS 10,755,177 B1 *    8/2020    Dabney ................. G06N 5/041
10,929,392 B1 *    2/2021    Cheng ................. G06F 16/242

(Continued)

*Primary Examiner* — Jose L Couso

(57) ABSTRACT

A triple verification method is provided. The triple verification method includes setting a triple having a source entity, a target entity, and a relation value between the source entity and the target entity by a setting unit, extracting a plurality of intermediate entities associated with the source entity and the target entity by the setting unit, defining a connection relation between the intermediate entity, the source entity, and the target entity and generating a plurality of connection paths connecting the source entity, the intermediate entity, and the target entity by a path generation unit, generating a matrix by embedding the plurality of connection paths into vector values by a first processing unit, calculating a feature map by performing a convolution operation on the matrix by a second processing unit, generating an encoding vector for each connection path by encoding the feature map by applying a bidirectional long short-term memory neural network (BiLSTM) technique by a third processing unit, and generating a state vector by summing the encoding vectors for each connection path by applying an attention mechanism and verifying the triple based on a similarity value between the relation value of the triple and the state vector by a determination unit.

20 Claims, 10 Drawing Sheets

(51) Int. Cl.
  *G06N 20/20* (2019.01)
  *G06N 20/10* (2019.01)
  *G06N 5/04* (2006.01)

(52) U.S. Cl.
  CPC ............. *G06N 5/046* (2013.01); *G06N 20/10* (2019.01); *G06N 20/20* (2019.01)

(58) Field of Classification Search
  CPC ............. G06F 16/9024; G06F 16/2246; G06F 16/284; G06F 16/3344; G06F 16/335; G06F 16/36; G06F 16/367; G06F 40/211; G06F 40/30; G06N 3/0454; G06N 3/084; G06N 5/046; G06N 20/10; G06N 20/20; G06N 5/022; G06N 3/0481; G06N 3/0445; G06N 5/04; G06N 5/025; G06N 3/02; G06N 3/08–088; G06N 7/00; G06N 20/00; G06T 3/4046; G06T 9/002; G06T 2207/20081; G06T 2207/20084; G06V 10/454; G06V 10/82; G06V 30/18057; G06V 10/945; G06V 10/7784
  See application file for complete search history.

(56) References Cited

U.S. PATENT DOCUMENTS

| | | | | |
|---|---|---|---|---|
| 2016/0371588 A1* | 12/2016 | Richardson | ............ | G06N 20/00 |
| 2017/0147635 A1* | 5/2017 | McAteer | ............ | G06F 16/2246 |
| 2020/0160194 A1* | 5/2020 | Stoilos | .................. | G06N 20/00 |
| 2020/0334545 A1* | 10/2020 | Sinha | .................... | G06N 3/049 |

* cited by examiner

After apply 4 filters to the input matrix

FIG. 9

| Query #1 | | Prediction |
|---|---|---|
| abdul_jabbar, athletePlaysSport, basketball | + | 0.89 |
| Query #2 | | |
| adam_bostick, athletePlaysSport, football | - | 0.89 |
| adam_bostick, athletePlaysSport, golf | - | 0.84 |
| adam_bostick, athletePlaysSport, baseball | + | 0.73 |
| adam_bostick, athletePlaysSport, basketball | + | 0.68 |
| adam_bostick, athletePlaysSport, hockey | - | 0.61 |
| adam_bostick, athletePlaysSport, boxing | - | 0.48 |
| Query #3 | | |
| clyde_drexler, athletePlaysSport, football | - | 0.91 |
| clyde_drexler, athletePlaysSport, basketball | + | 0.88 |
| clyde_drexler, athletePlaysSport, hockey | - | 0.87 |
| clyde_drexler, athletePlaysSport, baseball | - | 0.64 |

TRIPLE VERIFICATION DEVICE AND TRIPLE VERIFICATION METHOD

RELATED APPLICATION

This application claims the benefit of priority of Korean Patent Application No. 10-2019-0108915 filed on Sep. 3, 2019, the contents of which are incorporated herein by reference in their entirety.

FIELD AND BACKGROUND OF THE INVENTION

An embodiment of the present invention relates to a triple verification device and a triple verification method.

Knowledge graphs are resources useful for building intelligent systems such as question answering systems or recommendation systems. However, in most knowledge graphs, there is a case in which accurate information is not provided due to missing relations between entities. Embedding methods, which convert relations between the entities into low-dimensional spaces, provide useful results but only focus on direct relations between the entities and do not reflect path relations on a graph.

SUMMARY OF THE INVENTION

The present invention is directed to providing a triple verification device and a triple verification method capable of inferring missing paths in a knowledge graph and improving the quality and performance of a knowledge graph-based service.

One aspect of the present invention provides a triple verification method including setting a triple having a source entity, a target entity, and a relation value between the source entity and the target entity by a setting unit, extracting a plurality of intermediate entities associated with the source entity and the target entity by the setting unit, defining a connection relation between the intermediate entity, the source entity, and the target entity and generating a plurality of connection paths connecting the source entity, the intermediate entity, and the target entity by a path generation unit, generating a matrix by embedding the plurality of connection paths into vector values by a first processing unit, calculating a feature map by performing a convolution operation on the matrix by a second processing unit, generating an encoding vector for each of the connection paths by encoding the feature map by applying a bidirectional long short-term memory neural network (BiLSTM) technique by a third processing unit, and generating a state vector by summing the encoding vectors for each of the connection paths by applying an attention mechanism and verifying the triple based on a similarity value between the relation value of the triple and the state vector by a determination unit.

The triple verification method may further include performing a representation of the source entity, the target entity, and the intermediate entity into unique characteristics after the extracting of the plurality of intermediate entities or the generating of the plurality of connection paths.

The generating of the matrix may include generating the matrix by vectorizing each of the entities and the connection relation, which are included in the connection path, by applying a word2vec method.

The calculating of the feature map may include extracting the feature map by applying a convolutional neural network (CNN) technique to the matrix.

The encoding vector for each of the connection paths may be composed of a combination of a forward LSTM output and a backward LSTM output for the feature map.

The second processing unit may include a first neural network trained to perform convolution by applying a CNN technique, using a matrix embedded in a word2vec method as an input layer, and outputting a feature map as an output layer.

The third processing unit may include a second neural network trained to perform a forward LSTM and a backward LSTM by applying a BiLSTM technique, using a feature map calculated by a CNN method as an input layer, and outputting an encoding vector in which a forward LSTM output and a backward LSTM output are combined as an output layer.

The verifying of the triple may include, in the case of a connection path that has a relationship with the relation value included in the triple, assigning a weight to an encoding vector of the corresponding connection path according to the relationship with the connection path and generating the state vector by summing all weighted encoding vectors by the determination unit.

The verifying of the triple may include assigning a higher weight to the encoding vector of the corresponding connection path as the relationship with the relation value included in the triple becomes higher by the determination unit.

The verifying of the triple may include verifying the triple using a sigmoid function by the determination unit.

Another aspect of the present invention provides a triple verification device including a setting unit configured to set a triple having a source entity, a target entity, and a relation value between the source entity and the target entity and extract a plurality of intermediate entities associated with the source entity and the target entity, a path generation unit configured to define a connection relation between the intermediate entity, the source entity, and the target entity and generate a plurality of connection paths connecting the source entity, the intermediate entity, and the target entity, a first processing unit configured to generate a matrix by embedding the plurality of connection paths into vector values, a second processing unit configured to calculate a feature map by performing a convolution operation on the matrix, a third processing unit configured to generate an encoding vector for each of the connection paths by encoding the feature map by applying a BiLSTM technique, and a determination unit configured to generate a state vector by summing the encoding vectors for each of the connection paths by applying an attention mechanism and verify the triple based on a similarity value between the relation value of the triple and the state vector.

The first processing unit may perform a representation of the source entity, the target entity, and the intermediate entity into unique characteristics.

The first processing unit may generate the matrix by vectorizing each of the entities and the connection relation included in the connection path by applying a word2vec method.

The second processing unit may extract the feature map by applying a CNN technique to the matrix.

The encoding vector for each of the connection paths may be composed of a combination of a forward LSTM output and a backward LSTM output for the feature map.

The second processing unit may include a first neural network trained to perform convolution by applying a CNN technique, using a matrix embedded in a word2vec method as an input layer, and outputting a feature map as an output layer.

The third processing unit may include a second neural network trained to perform a forward LSTM and a backward LSTM by applying a BiLSTM technique, using a feature map calculated by a CNN method as an input layer, and outputting an encoding vector in which a forward LSTM output and a backward LSTM output are combined as an output layer.

In the case of a connection path that has a relationship with the relation value included in the triple, the determination unit may assign a weight to an encoding vector of the corresponding connection path according to the relationship with the connection path and generates the state vector by summing all weighted encoding vectors.

The determination unit may assign a higher weight to the encoding vector of the corresponding connection path as the relationship with the relation value included in the triple becomes higher.

The determination unit may verify the triple using a sigmoid function.

BRIEF DESCRIPTION OF THE SEVERAL VIEW OF THE DRAWINGS

The above and other objects, features, and advantages of the present invention will become more apparent to those of ordinary skill in the art by describing exemplary embodiments thereof in detail with reference to the attached drawings, in which:

FIGS. 3, 4, 5, 6, 7, 8 and 9 are views for describing the operation of the triple verification device according to the embodiment of the present invention.

DESCRIPTION OF SPECIFIC EMBODIMENTS OF THE INVENTION

Figure 1:
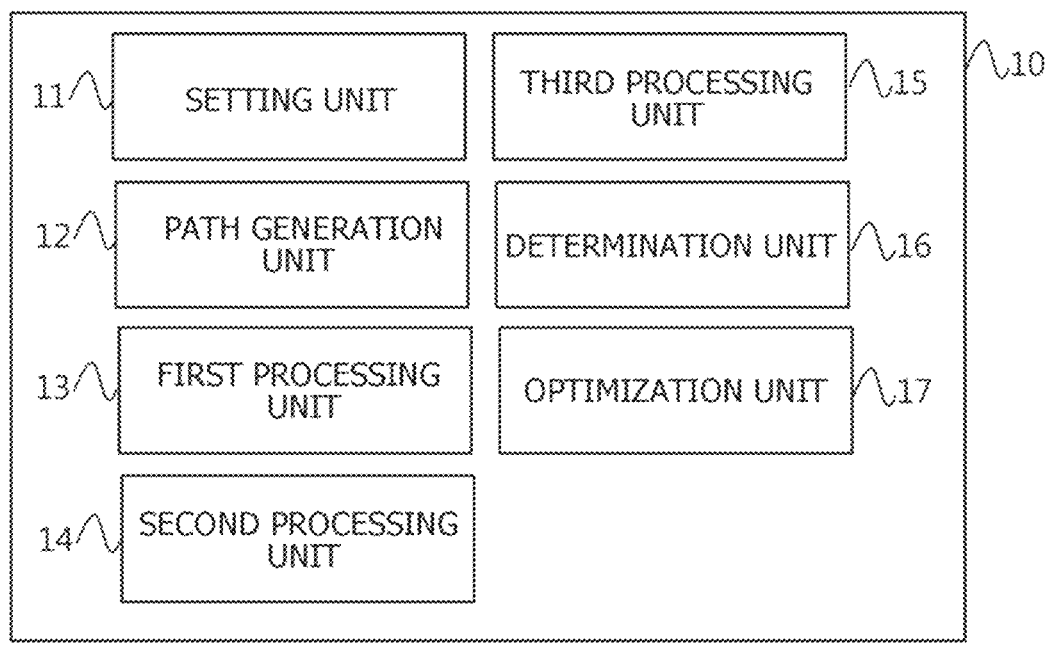
FIG. 1 is a block diagram illustrating a configuration of a triple verification device according to an embodiment of the present invention.

Hereinafter, exemplary embodiments of the present invention will be described in detail with reference to the accompanying drawings.

However, it should be understood that the technical spirit of the present invention is not limited to some embodiments to be disclosed below but may be implemented in many different forms. It should be understood that within the scope of the present invention, one or more elements of each of the embodiments may be selectively combined and substituted.

In addition, the terms (including technical and scientific terms) used in the embodiments of the present invention have the same meaning as commonly understood by one of ordinary skill in the art to which the present invention belongs. It should be further understood that terms, such as those defined in commonly used dictionaries, should be interpreted as having a meaning that is consistent with their meaning in the context of the related art.

Further, the terms used in the embodiments of the present invention are provided only to describe the embodiments and not for purposes of limitation.

In the present specification, the singular forms include the plural forms unless the context clearly indicates otherwise, and the phrase "at least one element (or one or more elements) of an element A, an element B, and an element C," should be understood as including the meaning of at least one of all combinations which may be obtained by combining the element A, the element B, and the element C.

Further, in describing elements of the present invention, terminologies such as first, second, A, B, (a), and (b) may be used.

These terms are used to distinguish an element from another element but a nature, an order, or a sequence of the elements is not limited by the terminology.

It will be understood that when an element is referred to as being "connected" or "coupled" to another element, it can be directly connected or coupled to another element, intervening elements may be present, or it can be connected or coupled to another element through the other element.

Further, when an element is described as being formed "on (above)" or "under (below)" another element, the term "on (above)" or "under (below)" includes both of a case in which two elements are in direct contact with each other or a case in which one or more elements are (indirectly) disposed between two elements. In addition, the term "on (above)" or "under (below)" includes a case in which another element is disposed in an upward direction or a downward direction with respect to one element.

Hereinafter, the embodiments will be described in detail with reference to the accompanying drawings, the same reference numerals are applied to the same or corresponding elements regardless of the drawing numerals, and overlapping descriptions will be omitted.

Figure 2:
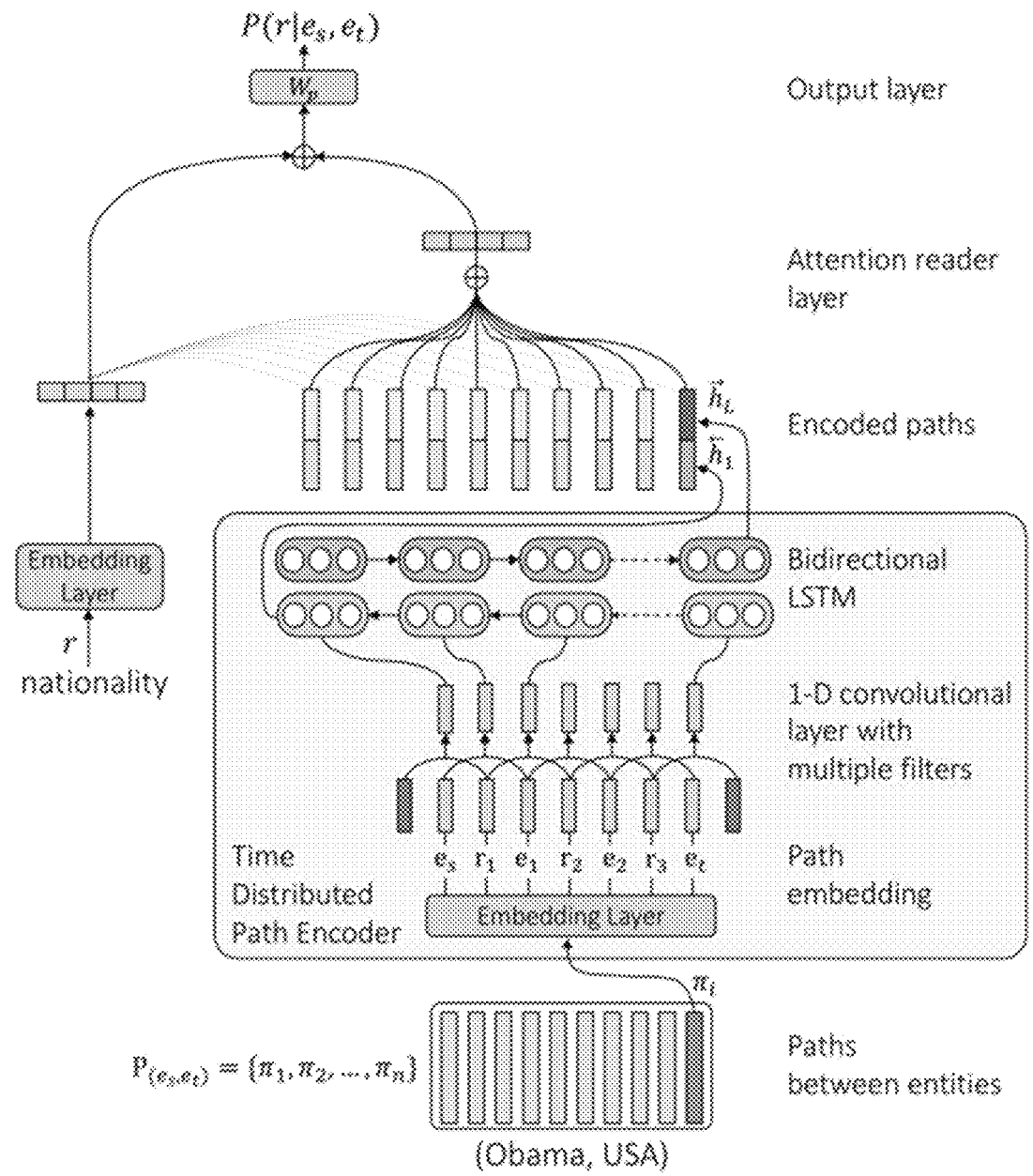
FIG. 2 is a conceptual diagram of the triple verification device according to the embodiment of the present invention.

FIG. 1 is a block diagram illustrating a configuration of a triple verification device according to an embodiment of the present invention, and FIG. 2 is a conceptual diagram of the triple verification device according to the embodiment of the present invention. Referring to FIGS. 1 and 2, a triple verification device 10 according to the embodiment of the present invention may include a setting unit 11, a path generation unit 12, a first processing unit 13, a second processing unit 14, a third processing unit 15, a determination unit 16, and an optimization unit 17.

The setting unit 11 may set a triple having a source entity, a target entity, and a relation value between the source entity and the target entity and extract a plurality of intermediate entities associated with the source entity and the target entity.

For example, the setting unit 11 may set the triple in a knowledge base. A large amount of data is stored in the knowledge base in the form of a triple. The knowledge base is an effective means for representing an atypical relation of data and is applied to various artificial intelligence techniques.

The knowledge base includes YAGO, Freebase, and DBpedia as typical examples and is used in the form of an ontology. The ontology is represented in the levels of Resource Description Framework (RDF), RDF Schema (RDFS), and Web Ontology Language (OWL). The RDF uses a graph model composed of a subject, a property, and an object, the subject and the object use resources represented by a Uniform Resource Identifier (URI) as instances, and the property is used to indicate the relationship between the subject and the object. The RDFS and the OWL are vocabulary extensions of the RDF, have a schema, and have various ways to represent resources when designing an ontology. As described above, a data representation method using the ontology allows computers to understand the concept represented in a triple and to process the knowledge. The knowledge base collects knowledge information on a website such as Wikipedia by converting the knowledge information into the triple.

In the embodiment, the triple may be composed of a source entity, a relation value, and a target entity. In the selected triple, there may be various intermediate entities connecting the source entity to the target entity. The setting unit 11 may extract various intermediate entities related to the source entity and the target entity in the knowledge base.

Here, the setting unit 11 may extract the entities using a random walk method.

The path generation unit 12 may define connection relations between the intermediate entities, and the source entity and the target entity and generate a plurality of connection paths connecting the source entity, the intermediate entities, and the target entity.

The path generation unit 12 may define the connection relations between the intermediate entities and generate the plurality of connection paths connecting a plurality of intermediate entities between the source entity and the target entity. The path generation unit 12 may generate the connection path connecting the source entity, at least one intermediate entity, and the target entity in this order. Here, the path generation unit 12 may define the connection relations connecting each entity.

Figure 3:
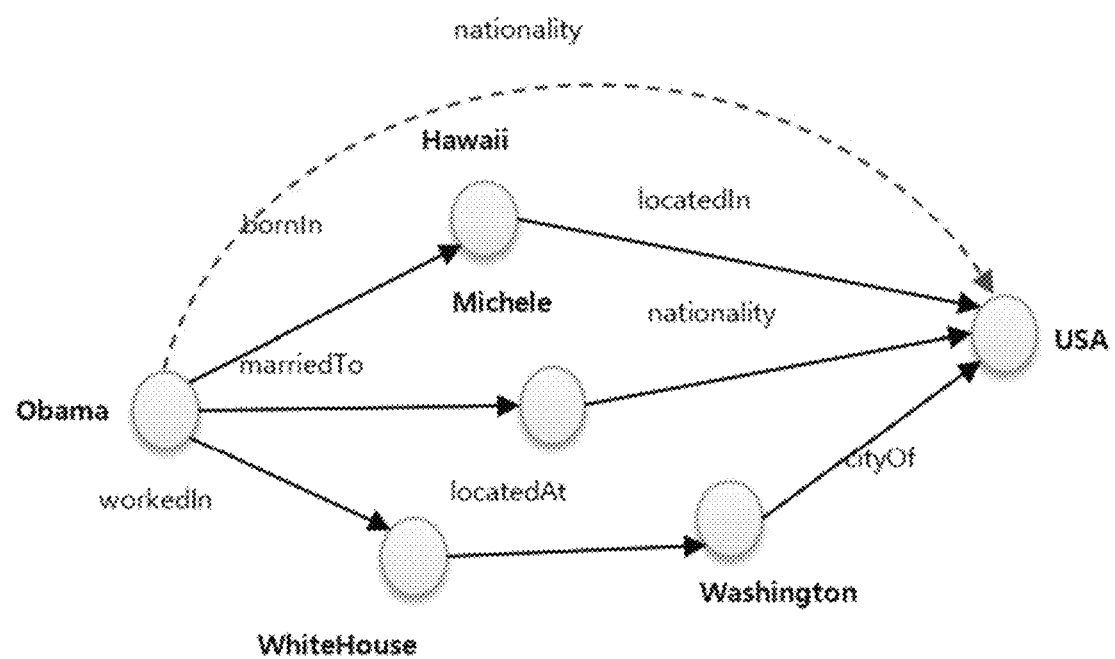

Referring to FIG. 3, the setting unit 11 may set a triple (Obama, nationality, USA) having "Obama" as the source entity, "USA" as the target entity, and "nationality" as the relation value in the knowledge base. In addition, the setting unit 11 may extract "Hawaii," "Michelle," "Whitehouse," and "Washington," which are the intermediate entities and connect "Obama" that is the source entity to "USA" that is the target entity, in the knowledge base.

The path generation unit 12 generates three connection paths connecting "Obama," which is the source entity, to "USA," which is the target entity, through "Hawaii," "Michelle," "Whitehouse" and "Washington," which are the intermediate entities. The path generation unit 12 may define "bornIn," "locatedIn," "marriedTo," "nationality," "workedIn," and "cityOf," which are the connection relations between the entities. Each entity and each connection relation may then be tokenized and used in an embedding process.

The first processing unit 13 may generate a matrix by embedding the plurality of connection paths into vector values.

The first processing unit 13 may generate the matrix by vectorizing each of the entities and the connection relations included in the connection paths by applying a word2Vec method.

Further, the first processing unit 13 may perform a representation of the source entity, the target entity, and the intermediate entities into unique characteristics. The representation is the task of converting each entity into the unique characteristic that can represent each entity. Accordingly, the number of model parameters may be reduced and computational bottlenecks may be avoided by representing each entity into the unique characteristic.

Figure 4:
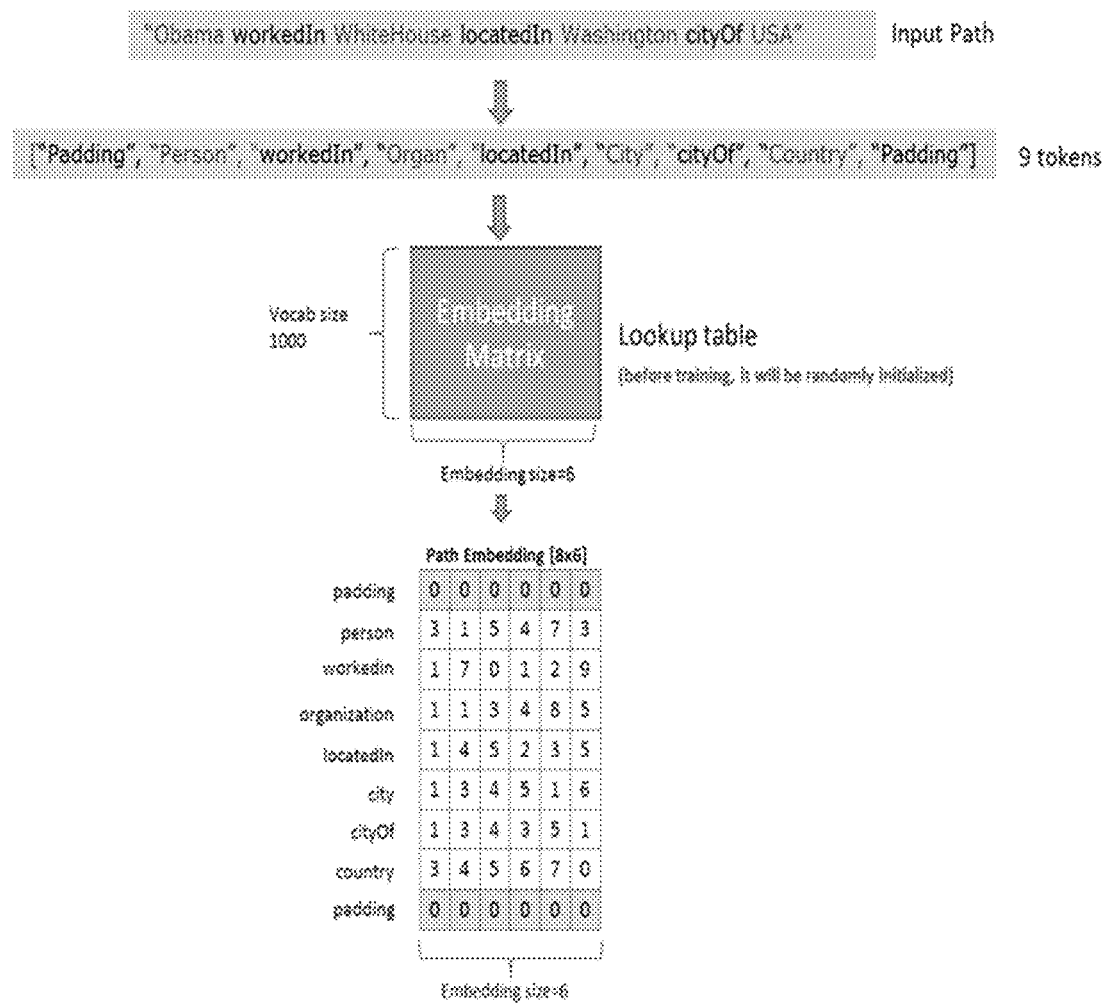

Referring to FIG. 4, first, the first processing unit 13 performs the representation of each entity and each connection relation. For example, in one connection path of "Obama workedIn WhiteHouse locatedIn Washington cityOf USA", the first processing unit 13 may perform the representation of the connection relations and the entities to be represented by "Padding", "Person", "workedIn", "Organ", "locatedIn", "City", "cityOf", "Country", and "Padding", which may then be tokenized by the first processing unit 13. The tokenized seven entities and the connection relations are then matched to the length of a convolutional neural network (CNN) input using a zero-padding method. Accordingly, the tokenized seven entities and the connection relations may be converted into nine tokens including two padding tokens, and each token may be represented by a vector using a word2vec library. Here, the row of a matrix is a word vector representation of each token.

FIG. 4 shows the conversion of tokens into a six-dimensional vector. When the dimension of a word vector is d and the length of a given sentence (the number of tokens in the sentence) is s, the dimension of a sentence matrix becomes sxd, and thus in the case of FIG. 4, the matrix has a shape of 9×6. In FIG. 4, a vector matrix of a simple dimension is described as an example for convenience of description, but a matrix having a more complicated dimension may be applied to actual implementation.

The second processing unit 14 may calculate a feature map by performing a convolution operation on the matrix.

The second processing unit 14 may extract the feature map by applying a CNN technique to the matrix.

Figure 5:
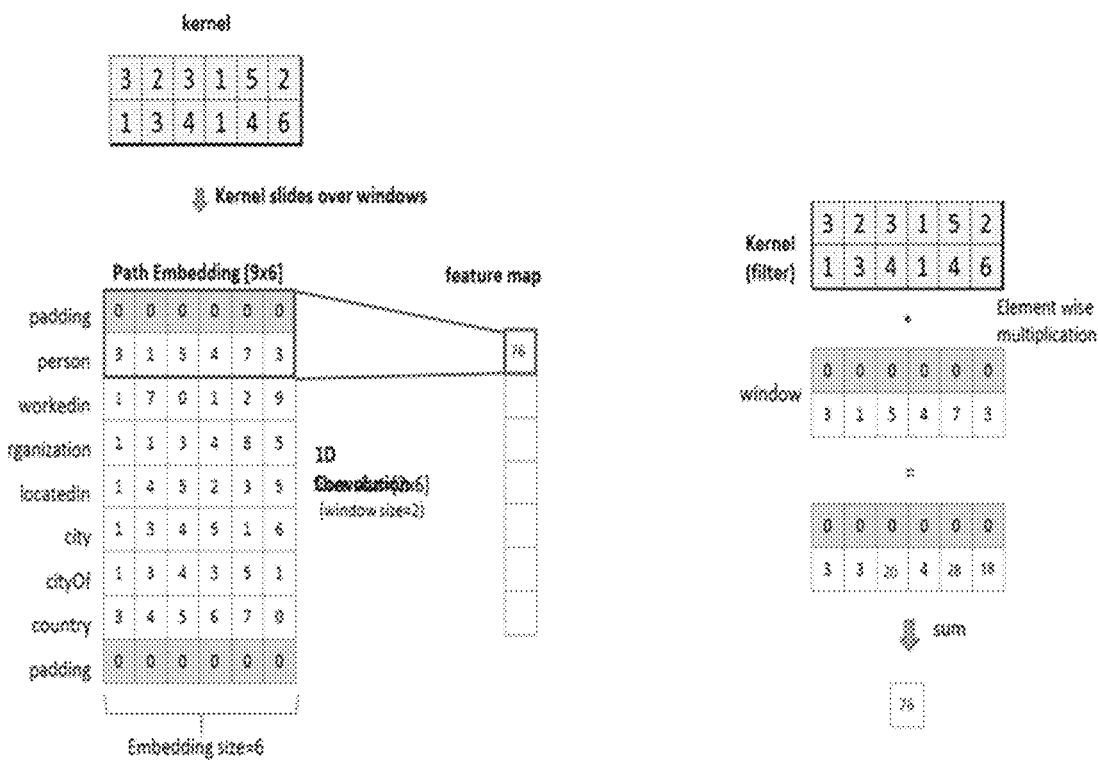
Figure 6:
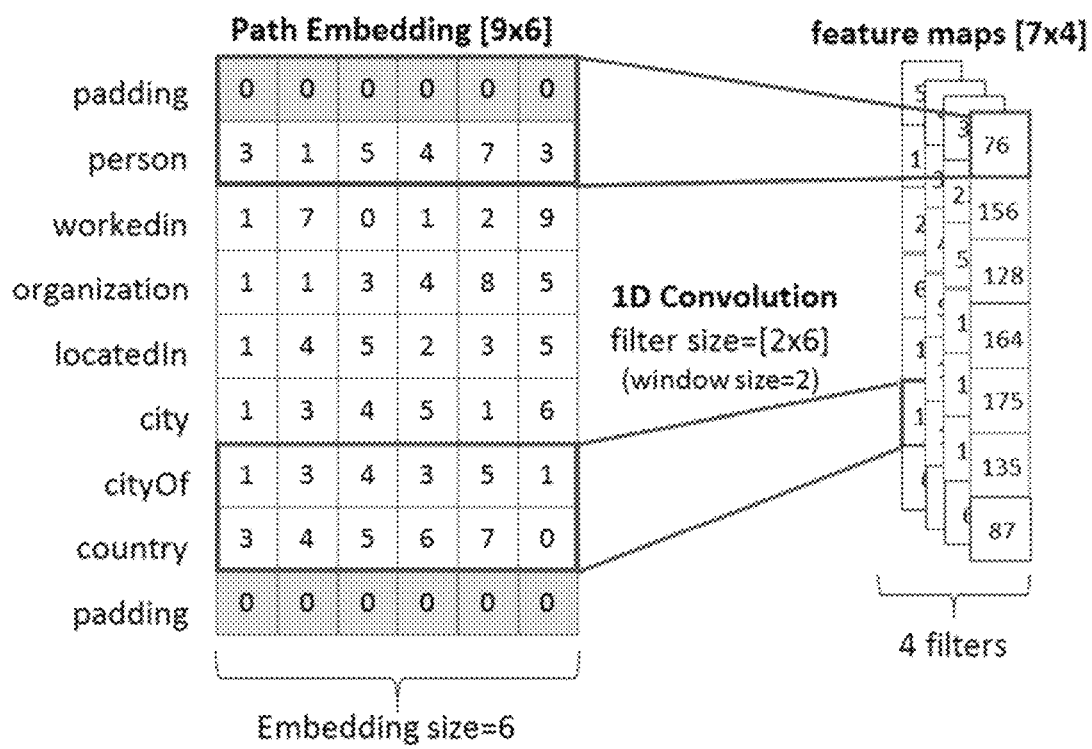

Referring to FIGS. 5 and 6, the second processing unit 14 may perform convolution using a filter. Since each row of the matrix represents one token, that is, a word, the width of the filter is "6", which is the same width as the dimension of the word vector. Accordingly, the width of the filter is fixed, and the height of the filter may be set differently. The height of the filter is the number of adjacent words that can be considered together and refers to the size of a context window. Here, a height h of the filter may be expressed as a region size of the filter. Multiple filters may be applied to the same region size to learn complementary features from the same region. In FIGS. 5 and 6, the second processing unit 14 calculates a feature map of 7×4 by adding a bias to an output value obtained by performing the convolution using a filter having a single region size and a height of two, that is, four 2×6 filters, and then applying an activation function. Window sliding is performed only from the top to the bottom with respect to a given sentence, and thus the feature map generated by each filter becomes a vector having a size of s−h+1 dimension and may be varied depending on the filter region size "h" and the sentence length "s".

For example, the second processing unit 14 may be trained to detect the feature map in the matrix. The second processing unit 14 may include a computer-readable program. The corresponding program may be stored in a recording medium or a storage device that may be executed by a computer. A processor in the computer may read the program stored in the recording medium or the storage device, execute the program, that is a trained model, calculate input information, and output calculation results.

An input of the second processing unit 14 may be a matrix in which the plurality of connection paths are embedded into the vector values, and an output of the second processing unit 14 may be a feature map calculated according to the CNN technique.

The second processing unit 14 may include a first neural network trained to perform convolution by applying the CNN technique, using a matrix embedded by the word2vec method as an input layer, and outputting the feature map as an output layer.

The third processing unit 15 may generate an encoding vector for each connection path by encoding the feature map by applying a bidirectional long short-term memory neural network (BiLSTM) technique.

The encoding vector for each connection path may be composed of a combination of a forward long short-term memory (LSTM) output and a backward LSTM output for the feature map.

Each element in the output of a convolution layer may represent a time step of a BiLSTM module. The third processing unit 15 may supply a q-dimensional vector to an LSTM cell in each step. LSTM basically stores the results of a previous calculation and may use this information in a current calculation. The third processing unit 15 may automatically set the number of hidden states of the LSTM cell to "d/2" to sequentially match the connection relations with the embedded connection paths. When the feature map vector C={c1, c2, ..., cl} is input to the third processing unit 15, the third processing unit 15 may generate a new vector H={h1, h2, ..., hl} by using the BiLSTM. When the outputs of the forward and backward LSTMs are represented by $\overrightarrow{h_j}$ and $\overleftarrow{h_j}$, respectively, the third processing unit 15 may calculate the forward and backward LSTMs according to Equation 1 below, $$\overrightarrow{h_j} = LSTM(\overrightarrow{h_{j-1}}, c_j)$$
$$\overleftarrow{h_j} = LSTM(\overleftarrow{h_{j-1}}, c_j).$$ [Equation 1]

The output of a BiLSTM layer may mean a sequence of hidden states for the feature map that is each input vector. Path embedding is obtained after processing all items of the path sequence using the BiLSTM. The BiLSTM may be represented by the last hidden state of the forward LSTM and the first hidden state of the backward LSTM. Accordingly, an encoding vector m for each connection path may be formed by connecting the output of the forward LSTM to the output of the backward LSTM according to Equation 2 below, $$m = [\overrightarrow{h_L}; \overleftarrow{h_j}].$$ [Equation 2]

Each connection path may be converted into the encoding vector using the BiLSTM in which the same LSTM operates in each path sequence.

Figure 7:
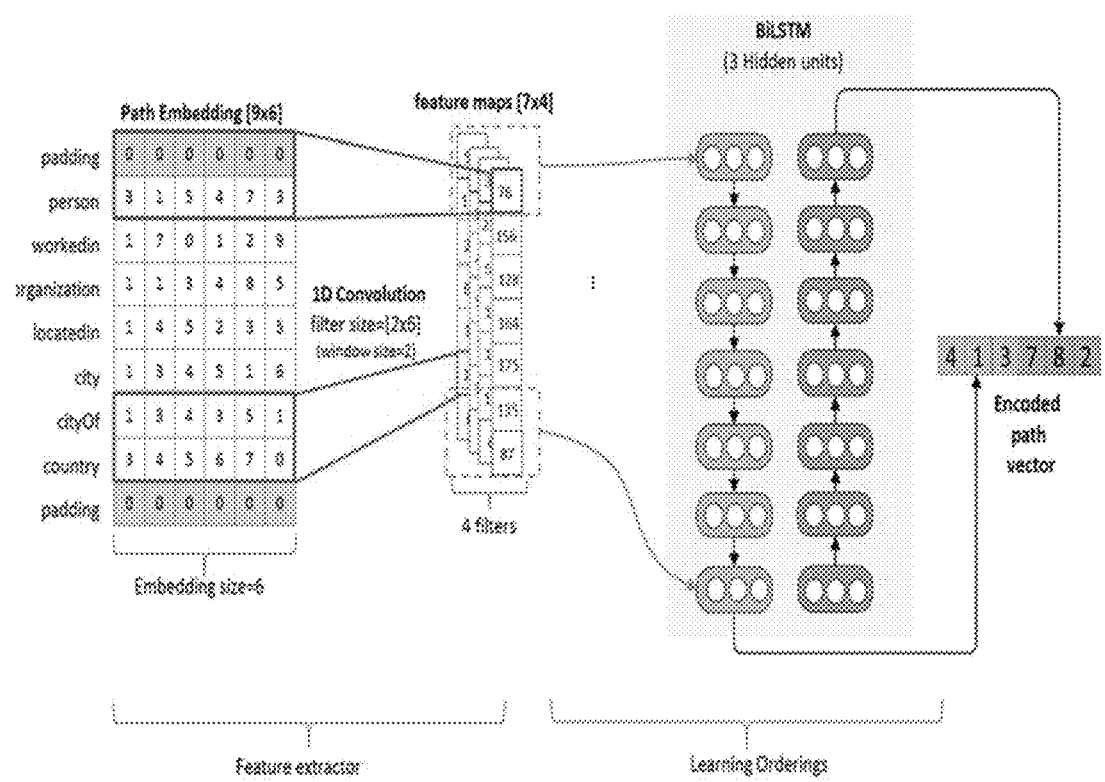
Figure 8:
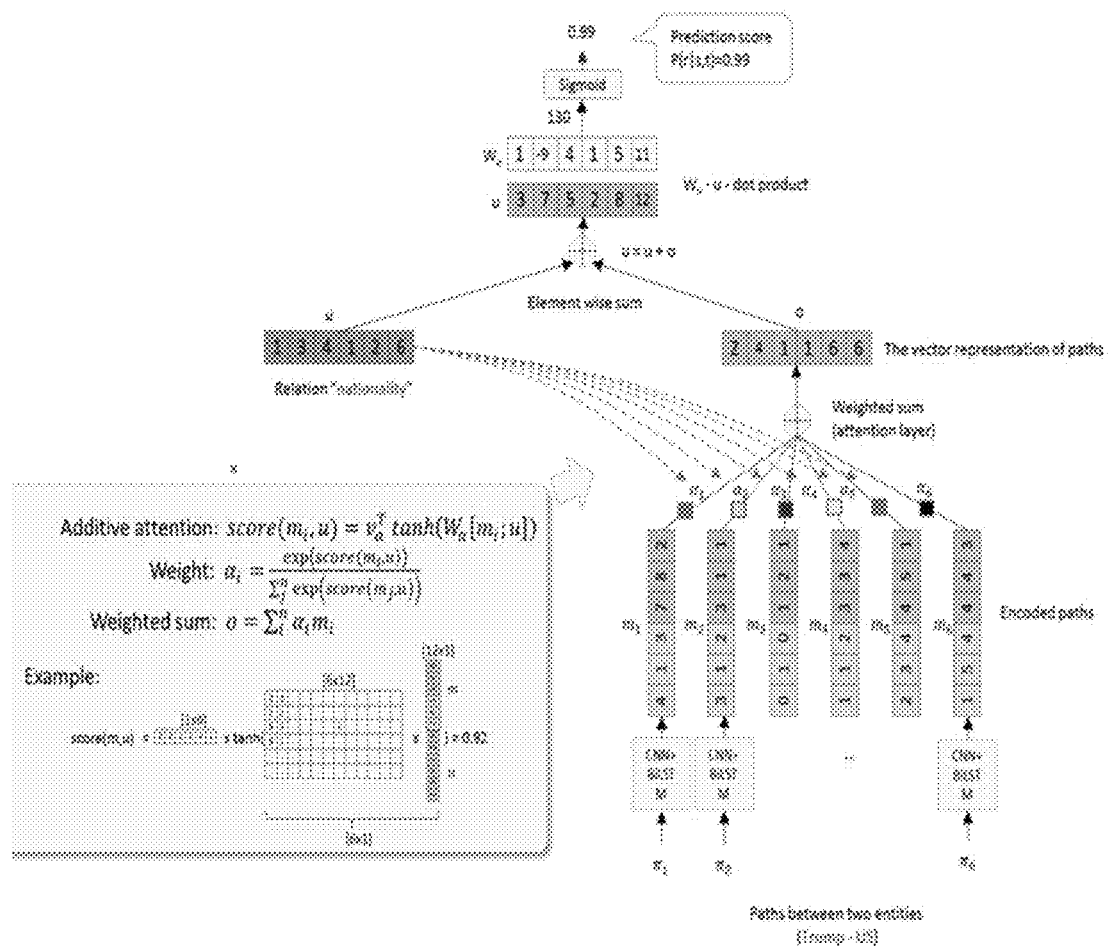

Referring to FIG. 7, the third processing unit 15 may use feature maps having 7×4 dimensions as an input and may apply each of the forward LSTM and the backward LSTM according to the above-described Equation 1. The third processing unit 15 may combine the output of each LSTM according to Equation 2 to generate an encoding vector having a dimension of 1×6. The encoding vector may be generated for each connection path.

For example, the third processing unit 15 may be trained to detect the encoding vector in the feature map. The third processing unit 15 may include a computer-readable program. The corresponding program may be stored in a recording medium or a storage device that may be executed by a computer. A processor in the computer may read the program stored in the recording medium or the storage device, execute the program, that is a trained model, calculate input information, and output a calculation result.

The input of the third processing unit 15 may be a feature map of a particular dimension, and the output of the third processing unit 15 may be an encoding vector calculated according to the BiLSTM technique.

The third processing unit 15 may include a second neural network trained to perform the forward LSTM and the backward LSTM by applying the BiLSTM technique, using the feature map calculated by the CNN method as an input layer, and outputting an encoding vector in which the forward LSTM output and the backward LSTM output are combined as an output layer.

The determination unit 16 may generate a state vector by summing the encoding vectors for each connection path by applying an attention mechanism and may verify the triple based on a similarity value between the relation value of the triple and the state vector.

In the case of the connection path that has a relationship with the relation value included in the triple, the determination unit 16 may assign a weight to the encoding vector of the corresponding connection path according to the relationship with the connection path and may generate the state vector by summing all weighted encoding vectors.

Here, the determination unit 16 may assign a higher weight to the encoding vector of the corresponding connection path as the relationship with the relation value included in the triple becomes higher. The determination unit 16 may convert the relation value included in the triple into a vector representation such as u=A(r)=r. Next, the determination unit 16 may assign a weight according to an attention mechanism to the encoding vector for each connection path. In the case of the connection path that has a relationship with the relation value included in the triple, the determination unit 16 may assign a higher weight to the encoding vector of the connection path as the relationship with the relation value becomes higher. On the contrary, the determination unit 16 may assign a lower weight to the encoding vector of the connection path that has no relationship with the triple relation value.

Table 1 below shows an example of weighting. In Table 1, "Relation" refers to the relation value of the triple and "Reasoning paths" refers to the connection paths. The determination unit 16 may assign a higher weight α as the relationship between the relation value of the triple and the connection path is high.

TABLE 1

| Relation | Reasoning paths | α |
|---|---|---|
| athleteplaysinleague | athlete homestadium stadium homestadium$^{-1}$ athlete playsin league | 0.046 |
| | athlete playsfor team coachesteam$^{-1}$ coach coachesin league | 0.044 |
| | athlete playsfor team playsin league competeswith league | 0.039 |
| teamplayssport | team coachesteam$^{-1}$ coach worksfor org plays sport | 0.024 |
| | team coachesteam$^{-1}$ coach hiredperson$^{-1}$ organization plays sport | 0.023 |
| | team playsagainst team belongsto$^{-1}$ person plays sport | 0.018 |
| athleteplayssport | athlete playsin sportsleague belongsto$^{-1}$ human plays sport | 0.068 |
| | athlete playsfor team belongsto$^1$ person plays sport | 0.043 |
| | athlete playsfor team sportsgame$^{-1}$ game sportsgame sport | 0.036 |
| worksfor | journalist writesfor publication writesfor$^{-1}$ journalist collaborateswith$^{-1}$ company | 0.028 |
| | journalist writesfor publication writesfor$^{-1}$ journalist worksfor company | 0.023 |
| | journalist collaborateswith$^{-1}$ agent acquired$^{-1}$ company acquired company | 0.022 |

The determination unit 16 may generate the state vector by summing all weighted encoding vectors.

For example, the determination unit 16 may generate the state vector according to Equation 3 below, $$\text{score}(m_i, u) = v_a \tanh(W_a[m_i; u]),$$

$$\alpha_i = \frac{\exp(\text{score}(m_i, u))}{\sum_{j}^{n} \exp(\text{score}(m_j, u))},$$

$$o = \sum_{i=1}^{n} \alpha_i m_i.$$

[Equation 3]

In Equation 3, $V_a$ and $W_a$ are weighting parameters, m is an encoding vector of an i-th connection path, u is an embedding vector of the relation value included in the triple, $\alpha_i$ is a weight assigned according to the relationship between the relation value and the connection path, and o is the state vector.

Next, the determination unit 16 may verify the triple according to the similarity value between the relation value of the triple and the state vector. In this case, the determination unit 16 may verify the triple using a sigmoid function. For example, the determination unit 16 may verify the triple depending on the similarity value between the relation value of the triple and the state vector according to Equation 4 below, $$P(r|e_s, e_t) = \text{sigmoid}(W_p(o+u)). \quad\quad [\text{Equation 4}]$$

In Equation 4, $e_s$ is the source entity, $e_t$ is the target entity, $W_p$ is a linear mapping weight, u is an embedding vector of the relation values included in the triple, o is the state vector, and sigmoid is a sigmoid function. $P(r|e_s, e_t)$ refers to a verification value, and the determination unit 16 may determine whether the triple is a valid triple according to the verification value.

The optimization unit 17 may optimize the verification value by minimizing binary cross-entropy loss. The optimization unit 17 may perform optimization by applying adaptive moment estimation (Adam). An objective function $L(\Theta)$ may be defined as in Equation 5 below, $$L(\Theta) =$$

$$-\frac{1}{N}\left(\sum_{e_s, r, e_t \in T^+} \log P(r|e_s, e_t) + \sum_{e_s^c, r^c, e_t^c \in T^-} \log(1 - P(r^c|e_s^c, e_t^c))\right).$$

[Equation 5]

In Equation 5, N is the number of triples in a training set, and $T^+$ and $T^-$ may refer to a true triple and a false triple, respectively.

$\Theta$ represents all parameters that may be learned in the model. The optimization unit 17 may train the model using the objective function according to Equation 5 and minimize the overall error while providing a higher value for the true triple and lowering the value for the corrupted false triple. In the case of link prediction, a development set may be used to retrieve top k-predictions from all candidates by adjusting the model parameters. The optimization unit 17 may also use a standard L2 of the weights as a constraint function. The model parameters may be initialized randomly and updated in consideration of the step of a slope at a constant learning rate in batch processing of training triples. The optimization unit 17 may stop learning when the objective function is converged to an optimal point.

FIG. 9 is a view for describing operation results of the triple verification device according to the embodiment of the present invention.

Referring to FIG. 9, Query #1, Query #2, and Query #3, each of which is composed of a source entity, a relation value, and a target entity, are proposed.

A verification value has a value between −1 to +1 according to the sigmoid function. The determination unit 16 may determine that the corresponding triple is a true triple when the verification value is equal to or greater than +0.6 and may determine that the corresponding triple is a false triple when the verification value is less than +0.6. A reference value of the verification value for determining the true triple and the false triple may be changed by setting.

In Query #1, the verification value of "abdul_jabbar," which is the source entity, "athletePlaysSport," which is the relation value, and "basketball", which is target entity, is calculated as +0.89. The determination unit 16 may determine a triple composed of a query (abdul_jabbar, athletePlaySport, basketball) as true.

In Query #2, the verification value is calculated by changing the target entity in a state in which the source entity and the relation value are fixed.

In Query #2, the highest verification value is calculated when the source entity is "adam_bostik," the relation value is "athletePlaySport," and the target entity is "baseball." Next, a verification value of +0.6 or more is calculated when the target entity is "basketball." The determination unit 16 may determine a triple composed of "adam_bostik," "athletePlaySport," and "baseball" and a triple composed of "adam_bostik," "athletePlaySport," and "basketball" as true. The determination unit 16 may determine the remaining triples except for the corresponding triples as false triples.

In Query #3, the highest verification value is calculated when the source entity is "clyde_drexler," the relation value is "athletePlaySport," and the target entity is "basketball." The determination unit 16 may determine a triple composed of "clyde_drexler," "athletePlaySport," and "basketball" as true. The determination unit 16 may determine the remaining triples except for the corresponding triple as false triples.

Figure 10:
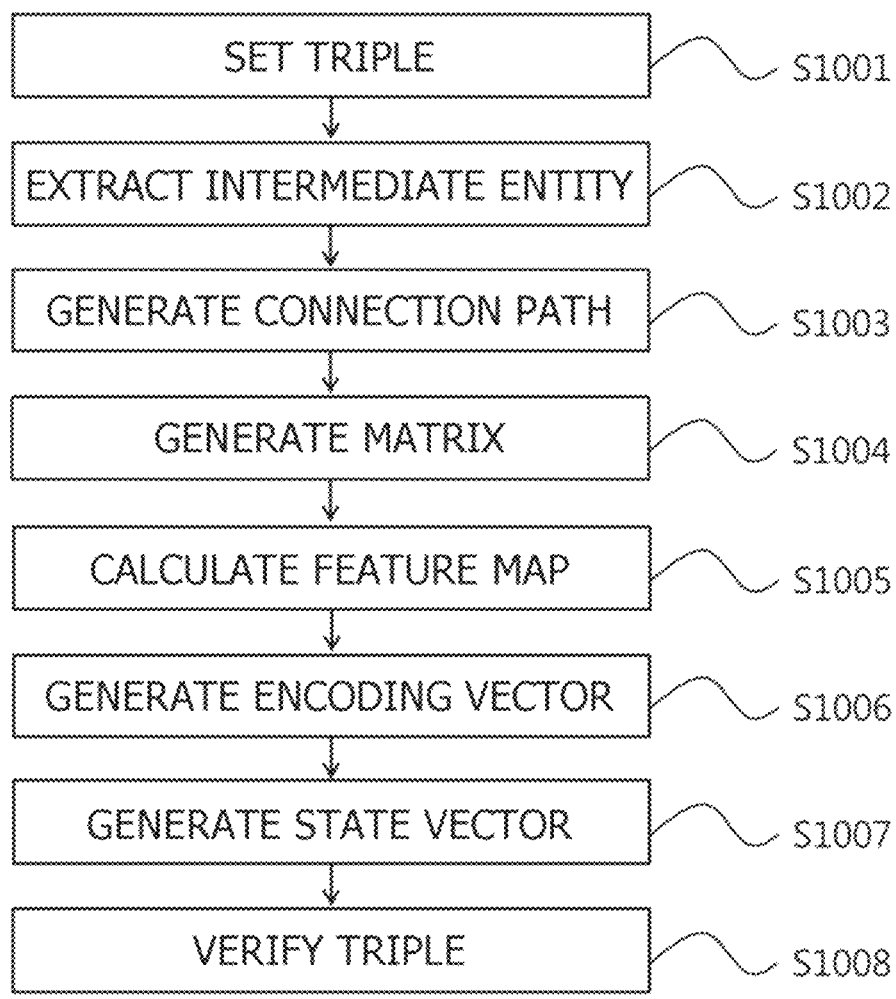
FIG. 10 is a flowchart of a triple verification method according to an embodiment of the present invention.

FIG. 10 is a flowchart of a triple verification method according to an embodiment of the present invention.

First, a setting unit sets a triple having a source entity, a target entity, and a relation value between the source entity and the target entity (S1001).

Next, the setting unit extracts a plurality of intermediate entities associated with the source entity and the target entity (S1002).

Next, a path generation unit defines connection relations between the intermediate entities and generates a plurality of connection paths connecting the plurality of intermediate entities between the source entity and the target entity (S1003).

Next, a first processing unit generates a matrix by embedding the plurality of connection paths into vector values (S1004).

Next, a second processing unit performs a convolution operation on the matrix to calculate a feature map (S1005).

Next, a third processing unit generates an encoding vector for each connection path by encoding the feature map by applying a BiLSTM technique (S1006).

Next, a determination unit generates a state vector by adding the encoding vectors for each connection path by applying an attention mechanism (S1007).

Next, the determination unit verifies the triple according to a similarity value between the relation value of the triple and the state vector.

The term "unit" used herein includes software, a field-programmable gate array (FPGA), or a hardware component such as an application-specific integrated circuit (ASIC), and the "unit" performs certain functions. However, the "unit" is not limited to the software or hardware. The "unit" may be configured to reside on an addressable storage medium or may be configured to play one or more processors. Therefore, the "unit" may include, for example, components (such as software components, object-oriented software components, class components, and task components), processes, functions, attributes, procedures, subroutines, segments of program code, drivers, firmware, microcodes, circuitry, data, databases, data structures, tables, arrays, and variables. Functions provided in components and "units" may be combined with a smaller number of components and "units," or may be further divided into additional components and "units." Furthermore, the components and "units" may be implemented to play back one or more CPUs in a device or a secure multimedia card.

A triple verification device and a triple verification method of the present invention can infer missing paths in a knowledge graph and can improve the quality and performance of a knowledge graph-based service.

Further, a triple verification device and a triple verification method of the present invention can predict new paths using existing knowledge-based paths.

Further, a triple verification device and a triple verification method of the present invention can be used to build an intelligent system, such as a question answering system or a knowledge graph-based recommendation system.

While the exemplary embodiments of the present invention and their advantages have been described above in detail, it will be understood by those of ordinary skill in the art that various changes, substitutions, and alterations may be made herein without departing from the scope of the invention as defined by the following claims.

What is claimed is:

1. A triple verification method comprising:
setting a triple having a source entity, a target entity, and a relation value between the source entity and the target entity by a setting unit;
extracting a plurality of intermediate entities associated with the source entity and the target entity by the setting unit;
defining a connection relation between the intermediate entity, the source entity, and the target entity and generating a plurality of connection paths connecting the source entity, the intermediate entity, and the target entity by a path generation unit;
generating a matrix by embedding the plurality of connection paths into vector values by a first processing unit;
calculating a feature map by performing a convolution operation on the matrix by a second processing unit;
generating an encoding vector for each of the connection paths by encoding the feature map by applying a bidirectional long short-term memory neural network (BiLSTM) technique by a third processing unit; and
generating a state vector by summing the encoding vectors for each of the connection paths by applying an attention mechanism and verifying the triple based on a similarity value between the relation value of the triple and the state vector by a determination unit.

2. The triple verification method of claim 1, further comprising performing a representation of the source entity, the target entity, and the intermediate entity into unique characteristics after the extracting of the plurality of intermediate entities or the generating of the plurality of connection paths.

3. The triple verification method of claim 1, wherein the generating of the matrix includes generating the matrix by vectorizing each of the entities and the connection relation, which are included in the connection path, by applying a word2vec method.

4. The triple verification method of claim 1, wherein the calculating of the feature map includes extracting the feature map by applying a convolutional neural network (CNN) technique to the matrix.

5. The triple verification method of claim 1, wherein the encoding vector for each of the connection paths is composed of a combination of a forward long short-term memory (LSTM) output and a backward LSTM output for the feature map.

6. The triple verification method of claim 1, wherein the second processing unit includes a first neural network trained to perform convolution by applying a CNN technique, using a matrix embedded in a word2vec method as an input layer, and outputting a feature map as an output layer.

7. The triple verification method of claim 1, wherein the third processing unit includes a second neural network trained to perform a forward LSTM and a backward LSTM by applying a BiLSTM technique, using a feature map calculated by a CNN method as an input layer, and outputting an encoding vector in which a forward LSTM output and a backward LSTM output are combined as an output layer.

8. The triple verification method of claim 1, wherein the verifying of the triple includes, in the case of a connection path that has a relationship with the relation value included in the triple, assigning a weight to an encoding vector of the corresponding connection path according to the relationship with the connection path and generating the state vector by summing all weighted encoding vectors by the determination unit.

9. The triple verification method of claim 8, wherein the verifying of the triple includes assigning a higher weight to the encoding vector of the corresponding connection path as the relationship with the relation value included in the triple becomes higher by the determination unit.

10. The triple verification method of claim 1, wherein the verifying of the triple includes verifying the triple using a sigmoid function by the determination unit.

11. A triple verification device comprising:
a setting unit configured to set a triple having a source entity, a target entity, and a relation value between the source entity and the target entity and extract a plurality of intermediate entities associated with the source entity and the target entity;
a path generation unit configured to define a connection relation between the intermediate entity, the source entity, and the target entity and generate a plurality of connection paths connecting the source entity, the intermediate entity, and the target entity;
a first processing unit configured to generate a matrix by embedding the plurality of connection paths into vector values;
a second processing unit configured to calculate a feature map by performing a convolution operation on the matrix;

a third processing unit configured to generate an encoding vector for each of the connection paths by encoding the feature map by applying a BiLSTM technique; and a determination unit configured to generate a state vector by summing the encoding vectors for each of the connection paths by applying an attention mechanism and verify the triple based on a similarity value between the relation value of the triple and the state vector.

12. The triple verification device of claim 11, wherein the first processing unit performs a representation of the source entity, the target entity, and the intermediate entity into unique characteristics.

13. The triple verification device of claim 11, wherein the first processing unit generates the matrix by vectorizing each of the entities and the connection relation included in the connection path by applying a word2vec method.

14. The triple verification device of claim 11, wherein the second processing unit extracts the feature map by applying a CNN technique to the matrix.

15. The triple verification device of claim 11, wherein the encoding vector for each of the connection paths is composed of a combination of a forward LSTM output and a backward LSTM output for the feature map.

16. The triple verification device of claim 11, wherein the second processing unit includes a first neural network trained to perform convolution by applying a CNN technique, using a matrix embedded in a word2vec method as an input layer, and outputting a feature map as an output layer.

17. The triple verification device of claim 11, wherein the third processing unit includes a second neural network trained to perform a forward LSTM and a backward LSTM by applying a BiLSTM technique, using a feature map calculated by a CNN method as an input layer, and outputting an encoding vector in which a forward LSTM output and a backward LSTM output are combined as an output layer.

18. The triple verification device of claim 11, wherein in the case of a connection path that has a relationship with the relation value included in the triple, the determination unit assigns a weight to an encoding vector of the corresponding connection path according to the relationship with the connection path and generates the state vector by summing all weighted encoding vectors.

19. The triple verification device of claim 18, wherein the determination unit assigns a higher weight to the encoding vector of the corresponding connection path as the relationship with the relation value included in the triple becomes higher.

20. The triple verification device of claim 11, wherein the determination unit verifies the triple using a sigmoid function.

\* \* \* \* \*